United States Patent [19]

Schmidt

[11] Patent Number: 5,009,718
[45] Date of Patent: Apr. 23, 1991

[54] THERMOCOUPLE CONSTRUCTION

[75] Inventor: Harald H. Schmidt, Georgetown, Canada

[73] Assignee: Mold-Masters Limited, Georgetown, Canada

[21] Appl. No.: 288,441

[22] Filed: Dec. 22, 1988

[51] Int. Cl.⁵ ............................................. H01L 35/02
[52] U.S. Cl. .................................... 136/232; 136/230; 136/233; 136/242
[58] Field of Search .................. 136/230, 232, 233, 242

[56] References Cited

U.S. PATENT DOCUMENTS

| | | | |
|---|---|---|---|
| 2,757,220 | 7/1956 | Carter | 136/4 |
| 3,376,170 | 4/1968 | Logan et al. | 136/233 |
| 3,923,552 | 12/1975 | Parris | 136/234 |
| 4,454,370 | 6/1984 | Voznick | 136/221 |
| 4,460,802 | 7/1984 | Benedict et al. | 136/230 |
| 4,488,269 | 12/1984 | Robinson et al. | 136/213 |
| 4,491,822 | 1/1985 | Davis et al. | 136/230 X |
| 4,493,939 | 1/1985 | Blaske et al. | 136/212 |
| 4,540,972 | 9/1985 | Davis | 136/230 X |
| 4,778,538 | 10/1988 | Lyman | 136/230 |
| 4,834,807 | 5/1989 | Burley | 136/230 X |

OTHER PUBLICATIONS

Temco Electric Heater Corporation Brochure Entitled "Thermocouples for Integrated Heating Torpedoes".

*Primary Examiner*—Peter A. Nelson
*Attorney, Agent, or Firm*—Dalesman & Company

[57] ABSTRACT

A thermocouple assembly and method of making it wherein a pair of wires formed of dissimilar metals extend through electrical insulating material in a thin flexible stainless steel sheath. A forward portion of the sheath containing the wires is snugly received in a nickel alloy casing which is then bent to form an opening to receive a screw therethrough to accurately secure the forward end of the thermocouple assembly in place. The casing is made strong enough to maintain the circular shape and bending the sheath and casing together securely retains the sheath in the casing.

6 Claims, 2 Drawing Sheets

THERMOCOUPLE CONSTRUCTION

BACKGROUND OF THE INVENTION

This invention relates generally to thermocouple and more particularly to a thermocouple assembly and a method of making it which facilitates secure and accurate location during use.

In many applications such as injection molding it is necessary to measure the temperature of a metal body at a specific location. In the past it has been known to provide a ring clip attached to the insulated wires which could be screwed at a particular location to the body. While this is satisfactory for many applications, it has been found in some high temperature situations where gases create a corrosive environment that the hermetically sealed wires must be protected against breakage so that the thin iron wire is safe from corrosion.

More recently, in order to overcome these problems, thermocouples have been provided with an integral thin stainless steel sheath as shown in the Temco Electric Heater Corporation brochure entitled "Thermocouples for Integrated Heating Torpedoes". While this overcomes the corrosion and degredation problems, the elongated sheath must of necessity have a small diameter so it is flexible to fit in different positions for different applications. However secure and accurate location of the forward end of the protective sheath containing the thermocouple remains a problem. As the stainless steel sheath must be small and thin to be flexible, it does not have sufficient strength to withstand clamping. It works well if it can be inserted into a small diameter bore in the body, but this is not always practicable.

SUMMARY OF THE INVENTION

Accordingly, it is an object of the present invention to at least partially overcome the disadvantages of the prior art by providing a thermocouple assembly wherein a forward portion of the thin protective sheath is received in a metal casing which is bent to a predetermined engageable shape. To this end, in one of its aspects, the invention provides a thermocouple assembly for measuring temperature adjacent the forward end thereof, the thermocouple assembly having a pair of wires formed of dissimilar metals extending through electrical insulating material in a thin metal sheath to a junction adjacent the forward end of the assembly, the improvement wherein a forward portion of the sheath is retainably received in a casing having a closed forward end, the casing and the enclosed portion of the sheath being bent to a shape suitable to engage retaining means to releaseably secure the forward end of the thermocouple assembly within said bent portion and in a desired position during use.

In another of its aspects, the invention provides a method of making a thermocouple assembly including mounting a pair of wires formed of dissimilar metals to extend through electrical insulating material in a thin metal sheath to a junction adjacent the forward end of the assembly, the improvement including the steps of forming a hollow metal casing of a predetermined length with a closed forward end and an open rear end, the casing having an internal diameter slightly larger than the external diameter of the sheath, inserting a forward portion of the sheath into the casing through the open rear end, and bending the casing to a shape suitable to engage retaining means to releaseably secure the forward end of the thermocouple assembly in a desired position during use.

Further objects and advantages of the invention will appear from the following description taken together with the accompanying drawings.

DETAILED DESCRIPTION OF THE DRAWINGS

Figure 1:
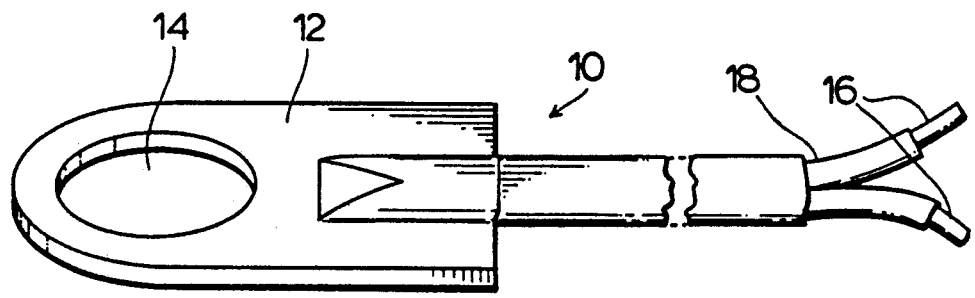
FIG. 1 is an isometric view of a prior art thermocouple assembly having a ring configuration.

Reference is first made to FIG. 1 which shows a thermocouple assembly 10 according to the prior art wherein a ring clip 12 having a hole 14 therethrough is secured to the forward end of the wires 16. As mentioned above, this arrangement has the disadvantage for some applications that it is difficult to provide a tight hermetic seal between the clip 12 and the insulation 18 and moisture and corrossive gases penetrate and corrodes the wires 16. Also, in very hot applications the insulation 18 melts or degrades and the wires 16 short out.

Figure 2:
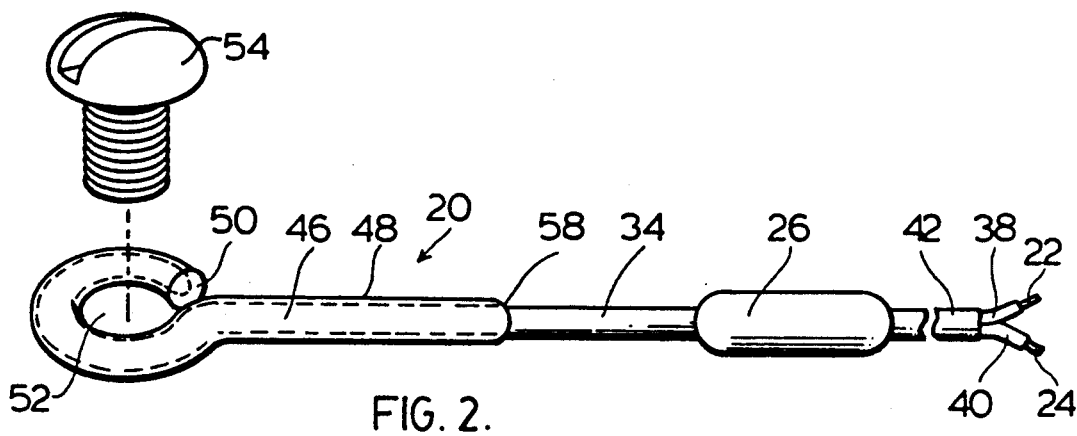
FIG. 2 is an isometric view of a thermocouple assembly according to one embodiment of the invention.

FIG. 2 shows an improved thermocouple assembly 20 made according to the present invention. A pair of lead wires 22,24 made of dissimilar metals such as iron and constantine connect in a molded transition 26 to corresponding dissimilar thermocouple wires 28,30. These wires 28,30 extend through an electrical insulator such as compacted magnesium oxide powder 32 in a thin metal sheath 34 to a junction (not shown) adjacent the forward end 36 of the sheath to form a J-type thermocouple. Of course, other types of thermocouples can be made using other types of metals. In the preferred embodiment shown, the sheath 34 is made of stainless steel to provide lasting protection against corrosion.

Figure 3:
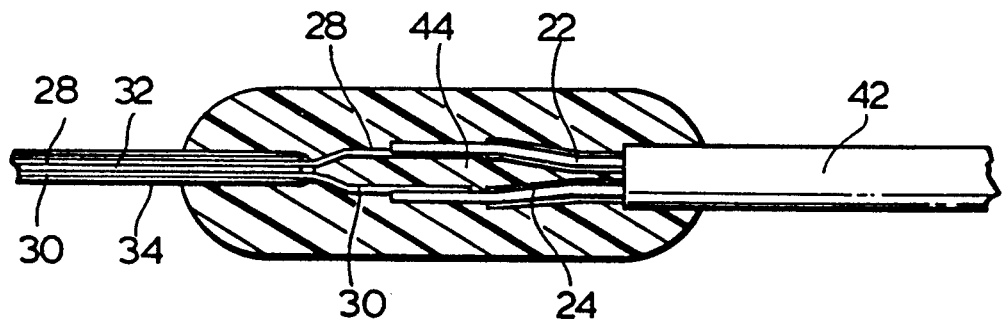
FIG. 3 is a sectional view through the molded transition seen in FIG. 2, and FIGS. 4-7 illustrate the sequence of steps in making the thermocouple assembly according to another embodiment of the invention.
Figure 4:
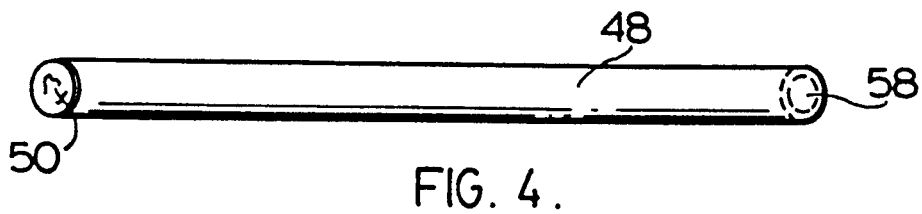
Figure 5:
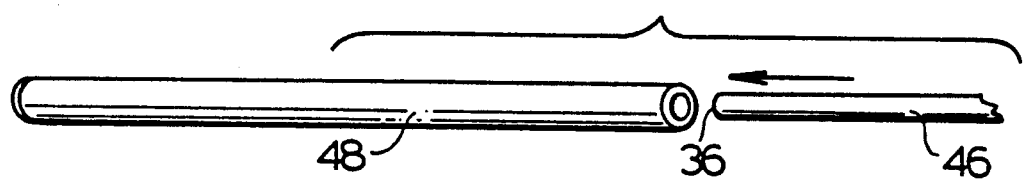

In this embodiment of the invention, the lead wires 22,24 are separately enclosed in KAPTON (Trade mark for polyimide polymer) insulation 38,40 and then wrapped together in KAPTON insulation 42. As seen in FIG. 3, the lead wires 22,24 are each welded to respective thermocouple wires 28,30 and then molded in an electrically insulative thermoset molding compound 44 to form the molded transition 26.

A forward portion 46 of the sheath 34 is received in a casing 48 having a closed forward end 50. The casing 48 and the enclosed forward portion 46 of the sheath 34 are bent to form a circular opening 52 to receive a connecting screw 54 to secure it in a desired position to the body (not shown) having its temperature monitored. The casing 48 is strong enough to maintain the shape of the opening 52 and bending the sheath 34 and the casing 48 together securely retains the sheath 34 in place in the casing 48. In the preferred embodiment shown, the casing is made of a corrosion resistant nickel alloy although other suitable materials may also be used. While the casing 48 and the forward portion 46 of the sheath are shown in this embodiment as being bent in a circular shape to receive the screw 54, they may be bent in other shapes suitable to engage retaining bolts or clamps to releaseably secure the forward end 56 of the thermocouple assembly 20 in a desired position and to retain the sheath 34 in the casing 48. The lead wires 22,24 extend to a conventional temperature controller or other monitor (not shown) depending upon the application.

Reference is now made to FIGS. 4-7 in describing the steps involved in making the thermocouple assembly described above. A hollow elongated sleeve or casing 48 is made of a suitable material such as a nickel alloy. The casing 48 has a predetermined length and an internal diameter which is slightly larger than the external diameter of the protective sheath 34. The forward end 50 of the casing 48 is welded closed, but the rear end 58 is open.

Figure 6:
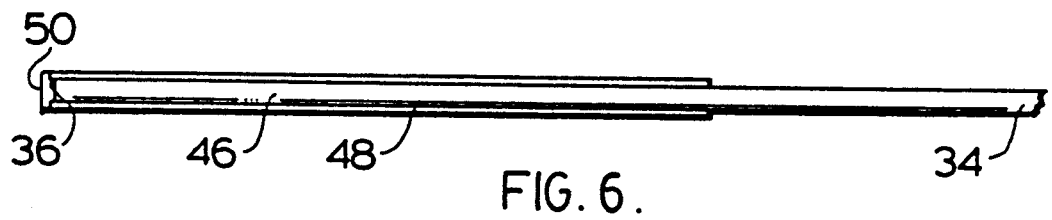
Figure 7:
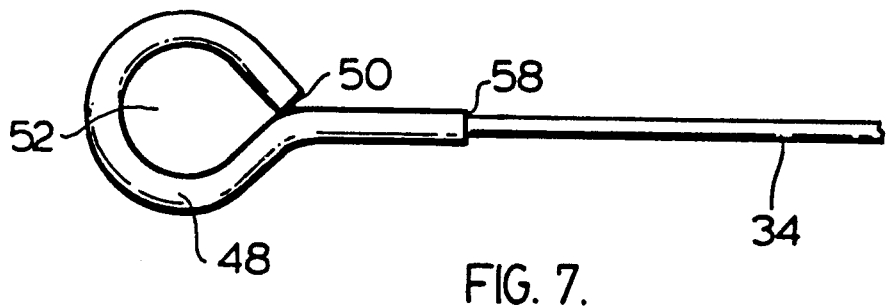

The forward portion 46 of the sheath 34 is then inserted through the open rear end 58 of the casing 48 to the position shown in FIG. 6 wherein the forward end 36 of the sheath 34 abuts against the closed forward end 50 of the casing to substantially fill the casing 48. The casing 48 and the enclosed sheath 34 are then bent to form the circular opening 52 to receive the screw 54 which also ensures the sheath 34 is securely retained in the casing 48. While the sheath is inserted all the way into the casing 48 in this embodiment, in other embodiments it is only inserted part way in depending upon the shape and the application.

While the description of the thermocouple assembly and the method of making it have been given with respect to preferred embodiments, it is not to be construed in a limiting sense. Variations and modifications will occur to those skilled in the art. For instance, the casing 48 can be made of various lengths and can be bent into different shapes to enable it to be accurately secured in position. Reference is made to the appended claims for a definition of the invention.

What I claim is:

1. In a thermocouple assembly for measuring temperature adjacent the forward end thereof, the thermocouple assembly having a pair of wires formed of dissimilar metals extending through electrical insulating material in a thin metal sheath to a junction adjacent the forward end of the assembly, the improvement wherein:
   a forward portion of the sheath is retainably received in a casing having a closed forward end, the casing and the enclosed portion of the sheath being bent to a shape suitable to receive connecting means therethrough in order to accurately secure the forward end of the thermocouple assembly within said bent portion and in a desired position during use.

2. A thermocouple assembly as claimed in claim 1 wherein the forward portion of the sheath and the casing are bent to form a circular opening and the connecting means is a screw.

3. A thermocouple assembly as claimed in claim 2 wherein the sheath is stainless steel.

4. A thermocouple assembly as claimed in claim 3 wherein the casing is a nickel alloy.

5. A thermocouple assembly as claimed in claim 4 wherein each of the wires connects to an insulated lead wire which, in turn, connects to a conventional monitor.

6. A thermocouple assembly as claimed in claim 5 wherein the wires are formed of lead and constantine respectively.

* * * * *